Dec. 7, 1965 P. J. HEINBERG 3,221,420
AUDIO-VISUAL TEACHING MACHINE AND METHOD
Filed Nov. 27, 1961 3 Sheets-Sheet 1
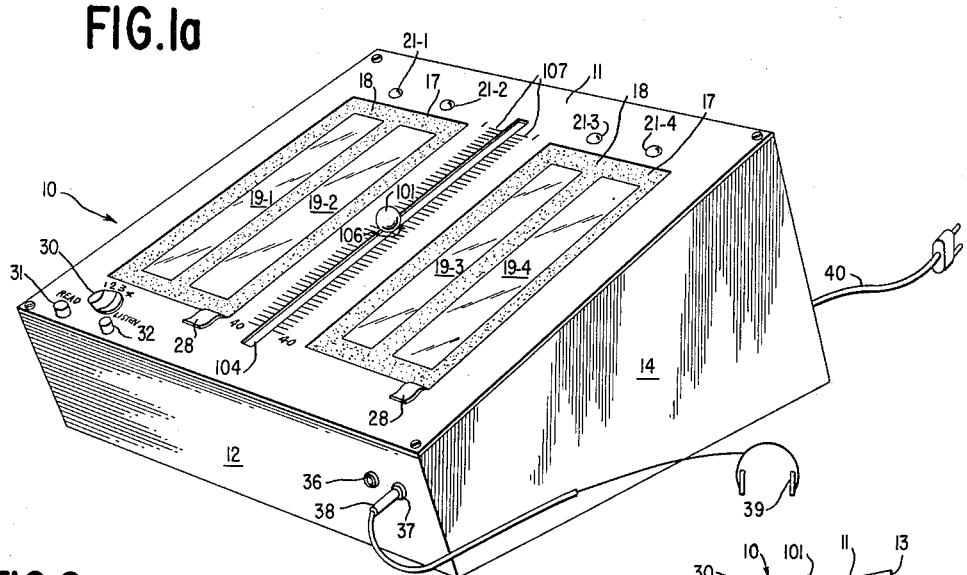
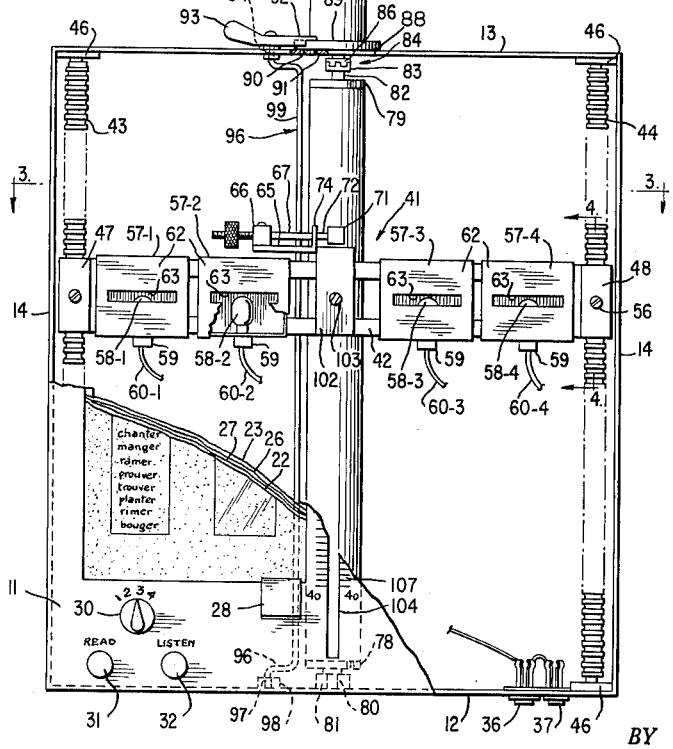
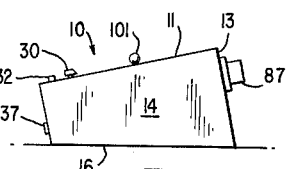
INVENTOR.
PAUL J. HEINBERG
BY Mead, Browne, Schuyler & Beveridge
ATTORNEYS

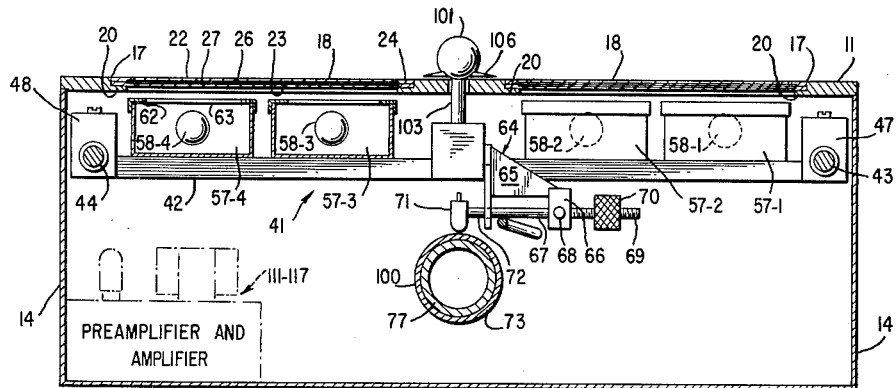
FIG.3
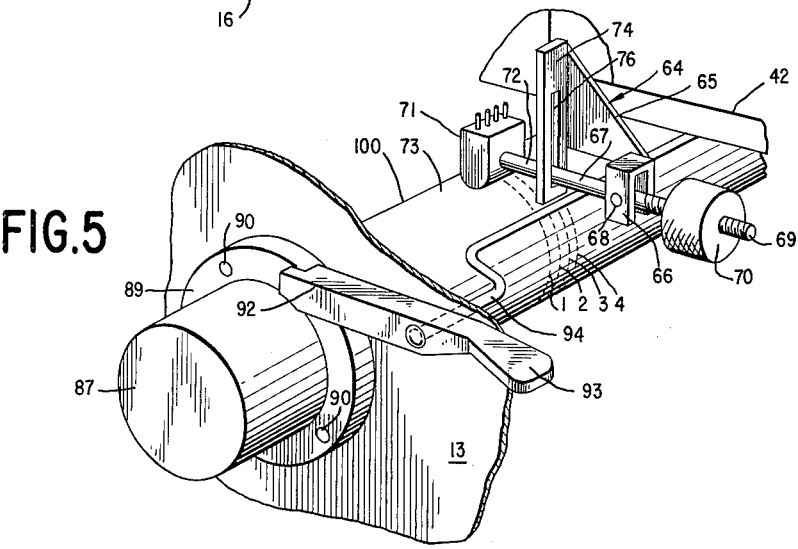
FIG.5
FIG.6
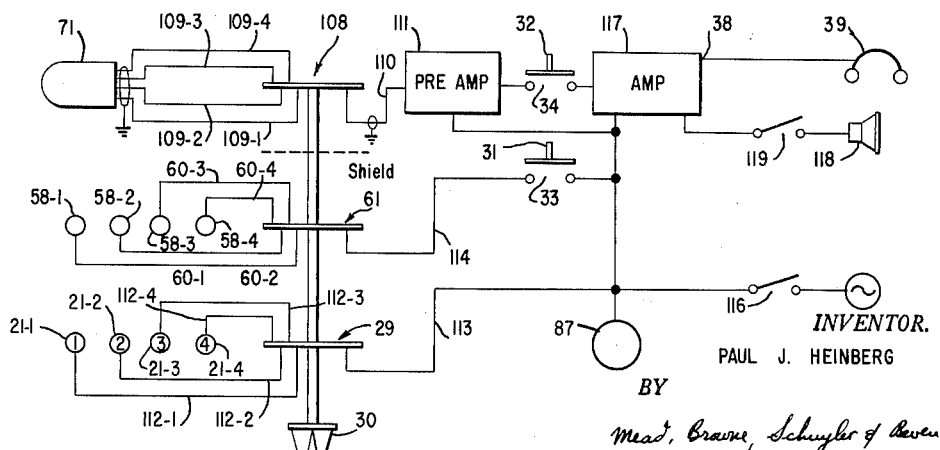

United States Patent Office 3,221,420
Patented Dec. 7, 1965

3,221,420
AUDIO-VISUAL TEACHING MACHINE
AND METHOD
Paul J. Heinberg, 1437 Franklin St., Iowa City, Iowa
Filed Nov. 27, 1961, Ser. No. 155,121
9 Claims. (Cl. 35—35)

This invention relates to teaching machines in general, and more particularly to a teaching machine for presenting audio and visual stimuli.

Learning to receive and to transmit any foreign language both orally and in writing involves the acquisition of numerous habitual associations between auditory and visual stimuli and written and oral responses. Research has shown that associations are learned when responses are reinforced, and learning is increased if reinforcements are immediately provided. The characteristic of immediate reinforcement is generally believed to account for the proven superiority of automated over conventional instruction. In teaching a foreign language immediate reinforcement requires the instructor—whether man or machine—to evaluate each student's response to each stimulus presented, a task which obviously becomes increasingly impossible for the human instructor as his class size becomes greater than one. However, tutorial instruction in the elements of a foreign language is not only impractical because of the number of language teachers that would be required but it is undesired by a language teacher because of the repetitiousness which tutorial instruction at that level demands. Therefore, it is an object of the present invention to provide a teaching machine which can present a stimulus to a student, either orally for the number of repetitions he desires, or visually for the duration he desires and which enables the student to determine the correctness or incorrectness of his oral or written response to any stimulus before another stimulus is presented.

Extant devices which attempt to fulfill this need are quite inadequate, being either non-auditory or non-reinforcing. That is, they are able to provide immediate reinforcement of written responses in one language to visual stimuli in another language, or they can provide stimuli without being able to reinforce the student by informing him of the correctness or incorrectness of his oral response. So-called language laboratories are useful for mimetic drill provided the instructor can listen to each student often enough to prevent the learning of any incorrect response to any stimulus provided. Hence, such laboratories are primarily useful for providing drill on responses which have been evaluated previously by the instructor in the classroom. They are, therefore, incapable of teaching elements of foreign languages without a great amount of concurrent human instruction. Therefore, another object of the invention is to provide a device which enables a student to determine for himself the adequacy of his own oral responses.

Prior teaching machines which seek to integrate the presentation to a student of auditory and visual stimuli have been rather complex and cumbersome machines as well as being very expensive so that their use has been limited. Thus, it is another object of this invention to provide an audio-visual teaching machine which may be cheaply produced and extremely simple in operation.

It is another object of this invention to provide a method of self-instruction which effectively and economically teaches independently of any human instruction all of the basic skills involved in the learning of any language.

It will be understood that as used herein, the term "language" is in no way restricted to a foreign language; as the device of the instant invention can perform at least as well with some "languages" as Morse code, shorthand, diacritics, musicography, etc., as well as with the spelling, pronunciation, syntax, etc. of one's native language. The stimuli may be phonetic, pictorial, or oral in either the native or foreign language or written in either the native or foreign language or any auditory and/or visual combination of these, and the response required could be any of these. Moreover, it will be understood that the program content may be words, phrases, statements requiring completion or questions requiring answers.

In general, the invention features chart means for carrying a plurality of normally non-visible printed character sequences arrayed in horizontal rows and vertical columns, and a light source for each column with each light source being selectively energized to present visual stimulus to a user of the machine. Audio stimulus is carried on a record medium having a plurality of parallel signal tracks with signals stored thereon corresponding to the character sequences carried by said chart means, respectively, with the signal tracks on said record medium being arranged in groups equaling the number of rows of non-visible character sequences and the number of signals in a group equaling the number of columns of non-visible printed character sequences. An indexable carrier member positions a scanning unit relative to the record member and at the same time positions the light sources relative to the chart means. Means are provided for selectively presenting one of said normally non-visible character sequences and, independently thereof, for producing a sound corresponding to the printed character sequence. The machine is so arranged that the user may present either the auditory or the visual simulus for as long as he desires as well as for conjoint operation of said selection means for simultaneous presentation of the stimuli.

The above objects, advantages and features of the invention will become more apparent from the following detailed description when taken in conjunction with the accompanying drawings wherein:

FIG. 1a is an isometric view of a teaching machine embodying the present invention;

FIG. 1b is a side elevational view of the device shown in FIG. 1a;

FIG. 2 is a top view of the device shown in FIG. 1a with a portion of the cover removed to show inside details thereof;

FIG. 3 is a cross-sectional view taken in the direction of the arrows 3—3 of FIG. 2;

FIG. 4 is a cross-sectional view taken on lines 4—4 of FIG. 2 showing details of the detent locating assembly;

FIG. 5 is an enlarged isometric view of a portion of the sound reproducing mechanism;

FIG. 6 is a diagrammatic electrical wiring diagram embodying the invention; and

Figure 7:
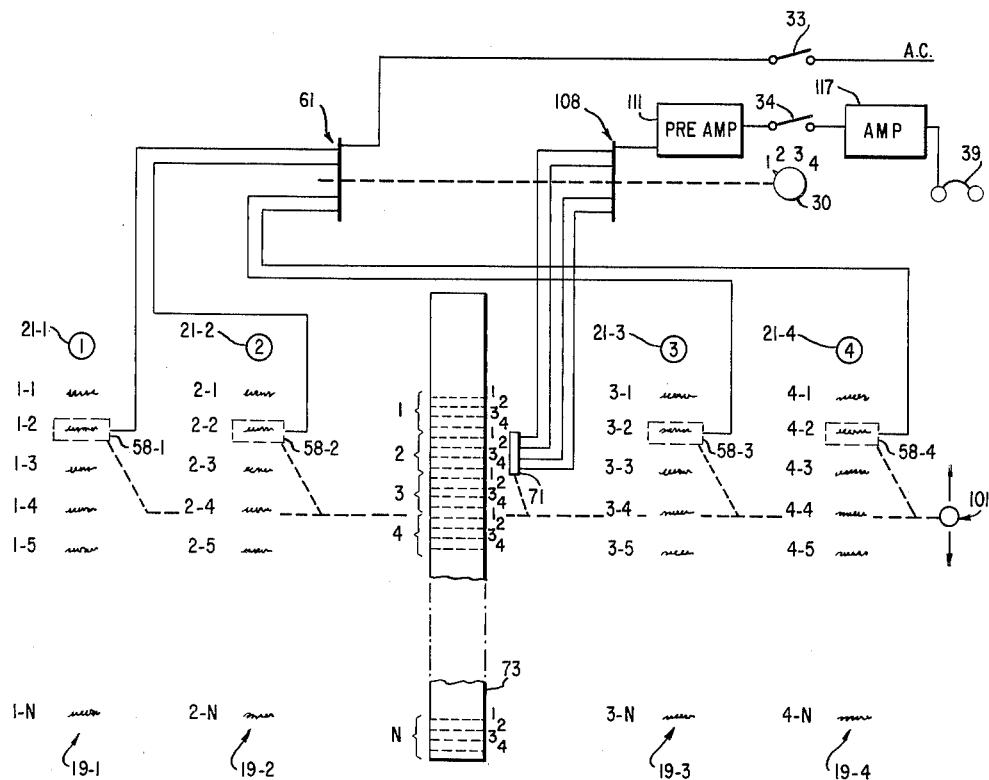
FIG. 7 is a diagrammatic illustration of an electromechanical selection matrix incorporating the invention.

With reference to FIG. 1, a teaching machine incorporating the invention comprises a housing 10 having a cover plate member 11. Cover 11 is at a 90° angle to front wall 12, rear wall 13 and sidewalls 14, while front wall 12 and rear wall 13 are at an angle to the base plate 16. Preferably, front wall 12 is somewhat shorter than rear wall 13. Thus, cover 11 is suitably inclined at an angle to optimally present visual stimuli to a student of average build. At the same time, this arrangement avoids the necessity of providing special mounting devices for the operative devices mounted within housing 10.

Cover 11 has formed therein one or more openings 17 for receiving changeable plastic inserts 18 which carry columns 19 of normally non-visible character sequences or program material. Each opening 17 is generally rectangular in shape and has formed recessed peripheral flanges 20 (FIG. 3) for supporting inserts 18. It will be appreciated that flanges 20 may be merely clips secured to the under surface of cover 11 with fingers projecting into openings 17. As shown in the present embodiment, there are four columns 19 of character sequences with a column indicator light 21–1, 21–2, 21–3 and 21–4, each column indicator light corresponding, respectively, to columns 19–1, 19–2, 19–3 and 19–4. The number of columns may be increased or decreased to increase or decrease the number of character sequences available for visual stimulus with corresponding increases or decreases in the number of auditory stimulus available.

Preferably, each plastic insert 18 is formed from a plurality of laminations in which two outer layers 22 and 23 of transparent material, such as plastic, are sealed along their marginal edges 24 in a conventional fashion to enclose and suport a photographic negative or film 26 on which the character columns 19 are carried. An important feature of the invention is that the character sequences or columns of printed matter carried on the film 26 are normally non-visible. A sheet of translucent material 27, such as frosted plastic, is placed between the top lamination 22 and the film 26 so that the printed matter on the film 26 is never visible unless illuminated from behind the negatives. However, it will be apparent that with an exposed and developed negative film, in which the light and shadows are the reverse of what they are in a positive print from the negative, and with relatively dark framing, the translucent sheet 27 may be eliminated. A tab 28 extends from each laminated insert 18 to allow easy removal thereof from cover opening 17.

Column indicator lights 21–1 through 21–4 are energized through actuation of column selection switch 29 according to the position of manual actuating knob 30 on cover 11. The indicia numerals 1, 2, 3 and 4 correspond, respectively, to column lamps 21–1 through 21–4. "Read" button 31 and "listen" button 32 control switches 33 and 34 respectively (see FIG. 6) for purposes to be described more fully hereinafter. The switch location shown in FIGS. 1 and 2 are particularly adapted for use by a right-handed student. The location of these switch actuators may be shifted to the right-hand side of cover 11 for a left-handed student. In each case, it is preferred to leave the student's writing hand free for use during use of the machine.

A pair of parallel headphone jacks 36 and 37 mounted at the right-hand side of wall 12 receive headphone plugs 38 of a headset 39. As shown in FIG. 1, only one headset is shown connected to the device. This headset would normally be the student's headset. Jack 36 which is connected electrically in parallel with jack 37 allows an instructor to hear a passage which a student is having trouble with. Alternatively, a speaker (not shown) may be utilized in place of the headphones in case the machine is being used where there would be no interference with others, as for example, in a private home.

Cord and plug set 40 carry alternating current power to the machine from any convenient outlet.

On the inside of housing 10 is a carrier unit 41 having a frame 42 extending transversely between indexing and guide rods 43 and 44 which are provided at their extreme ends with mounting blocks 46. The arrangement is such that index and guide rods 43 and 44 are parallel to each other, sidewalls 14 and cover plate 11. Due to the fact that front wall 12 and rear wall 13 are in planes normal to cover plate 11, index rods 43 and 44 may be mounted in the required position with relative ease.

Guide blocks 47 and 48 secured to the outer ends of frame 42 are provided with guide bores 49 of approximately the same diameter as the diameter of the index and guide rods 43 and 44. As best seen in FIG. 4, each guide and index rod is provided with a plurality of annular index grooves 50, each annular groove 50 corresponding to an index position. The number of annular index grooves 50 correspond to the number of rows of character sequences contained in columns 1, 2, 3 and 4 and serve to positively locate carrier 41 relative to inserts 18. Guide blocks 47 and 48 have threaded bores 51 transverse to bores 49. Detent ball 52 is biased through reduced opening 53 into one of annular grooves 50 by spring member 54 acting between ball detent 52 and an adjustable set screw 56. Set screw 56 may increase or decrease the pressure on detent ball 52. It will be appreciated that detent ball 52, with index guide rod 44 and the annular grooves therein form cooperating detent devices for positively locating frame 42 relative to opening 17 and cover 11 and the inserts 18 carried therein. Moreover, except for detent ball 52, guide block 48 slides freely over index rods 43 and 44.

Spacedly mounted on frame 42 of carrier 41 are lamp boxes 57–1, 57–2, 57–3 and 57–4 which correspond to columns 19–1, 19–2, 19–3 and 19–4, respectively, on inserts 18. Each lamp box carries separately energizable lamps 58–1 through 58–4 mounted in sockets 59, which, through electrical conductors 60, connect the lamps to switching member 61. Switching member 61 selects the circuit to one of lamps 58–1 through 58–4 and conditions the selected circuit for energization.

Each light box, 57–1 to 57–4 includes a light slot 63 of sufficient dimension to cover only one character sequence or row for the illumination thereof. Preferably, the outside surfaces of covers 62 are painted black to reduce light dispersion. For the same reason, covers 62 are positioned very close to the under surface of inserts 18.

Referring to FIGS. 2, 3 and 5, bracket 64, secured to and movable with carrier 41, has an arm 65 extending outwardly from the center of frame 42 to which yoke member 66 is secured. Balance bar 67 is pivoted on fulcrum pin 68 which extends between the arms of yoke member 66. A threaded end 69 of balance bar 67 carries counterweight member 70 which is threadably engaged with end 69 of balance bar 67. Multiple unit playback head 71 is fixedly supported on end 72 of balance bar 67 to provide the correct head pressure for maximum signal to noise ratio with minimum distortion. It will be appreciated that the mounting for multiple track scanning head 71 assures that the center line of head 71 is perpendicular to the tangent of cylinder 73 and, at the same time, that this relation is maintained as carrier 41 is indexed along rods 43 and 44.

Slotted member 74 has formed therein a guide slot 76 through which balance arm 67 passes. Guide slot 76 serves to assure exact alignment of head 71 with carrier 42. Guide rods 43 and 44 assure proper alignment of the frame with cylinder 73.

Cylindrical record member 73 is carried on cylinder drum member 77 and held fixed thereto by clamp members 78 and 79 which prevent slippage of cylinder 73 on drum member 77. Clamp member 78 also serves as a stop element to positively locate the cylinder 73 on the drum member 77.

Drum 77 has a journal shaft 80 extending from one end thereof which journal shaft is removably received in bearing member 81 secured to front wall 12 of housing 10. Stub shaft 82 extends from the other end of drum 77 and carries one part 83 of resilient coupling member 84. The other part 86 is carried on the end of the shaft projecting from synchronous gear motor 87. In the embodiment disclosed herein, coupling parts 83 and 86 are normally not separable so that removal of motor 87 is effective to remove the drum 77 and cylinder 73 from within housing 10. As shown in FIG. 2, rear wall 13 of housing 10 has an opening 88 which is somewhat larger than the diameter of cylinder 73 so that when drum 77 is removed cylinder 73 passes freely through the rear wall 13 as the motor 87 and drum 77 are moved in a generally rearwardly direction.

Motor 87 has integral with the frame thereof a mounting and locating flange 89 with projecting locating pins 90 passing through locating holes 91 in the rear wall 13. Motor 87 is secured in the position shown in the drawings by cam lock member 92 which engages flange 89. The inside surface (not shown) of cam lock 92 is preferably tapered slightly so that flange plate 89 is forced against the rear panel 13. Operating lever 93 is secured to the extending end 94 of head elevating bar 96. The extending end 94 of head elevating bar 96 passes through an opening (not shown) in the rear panel 13 which opening serves as a bearing support and fulcrum point for lever 93. The other end 97 of head elevating bar 96 is rotatably received in bearing member 98 (see FIG. 2).

It will be noted that head elevating bar 96 includes an offset portion 99 which joins the end parts 94 and 97 and that this offset portion passes directly beneath balance bar 67. Thus, when lever 93 is moved in the direction to release cam lock 92 from flange 89, which in the disclosed embodiment would be in a clockwise direction, offset portion 99 of head elevating bar 96 raises end 72 of balance bar 67 and head 71 out of operating relationship with cylinder 73. The motor 87 and drum may then be removed without any harm to the cylinder 73 or any harm to head 71.

While in the embodiment herein disclosed, the motor 87 is shown as being removable to facilitate changing of cylinder 73 by removal thereof through the rear wall 13, it will be appreciated that cam lock 92, along with flange member 89 may be on the front wall 12 of the housing for effecting removal of cylinder 73 in a similar manner.

In the preferred embodiment the record medium comprises a film of magnetic material, such as iron oxide, carried on the outer surface 100 of cylinder 73. Cylinder 73 may be any lightweight material such as paper board, plastic, aluminum, etc.

As best shown in FIG. 3, carrier 41 may be manually moved to different index positions to locate head 71 at a selected position along cylinder 73 and at the same time to locate light boxes 57–1 through 57–4 at a selected row of character sequences carried on inserts 18. The frame 42 of carrier 41 includes a rigid member 102 having an upwardly projecting rod 103 on which is secured manual actuating knob 101. Rod 103 passes through an elongated slot 104 in the cover plate 11. Pointers 106 indicate the numerical position of carrier 41 on index or row markings 107 at each side of slot 104.

The numbers of indicia marks 107 correspond to the number of index positions along index rods 43 and 44, the number of such index positions corresponding to the number of rows of character sequences carried in columns 1, 2, 3 and 4 on each insert 18. Record cylinder 73 is likewise divided into a corresponding number of groups of parallel signal tracks. The number of groups of record tracks equals the number of index positions, with the number of record tracks in each group corresponding to the number of columns carried on inserts 18. Thus, there are four record tracks in each group of record tracks with the number of groups of record tracks equaling the number of rows of character sequences contained in the columns 1, 2, 3 and 4. Each record track of a group of record tracks on cylinder 73 is scanned by multiple circuit scanning head 71. However, each scanning unit of multiple unit scanning head 71 is rendered independently effective in accordance with the position of selecting knob 30.

Referring now to the electrical schematic shown in FIG. 6 and the selection system illustrated in FIG. 7, each record track on record medium 73 is scanned by one of the scanning elements in multiple unit scanning head 71. However, only one of said elements is utilized at a time as determined by the position of column selecting knob 30. As shown in FIG. 6, switch member 108 connects only one of conductors 109–1 through 109–4 to the input conductor 110 of preamplifier 111. Similarly, switches 29 and 61 control the connection of one of conductors 112–1 through 112–4 to conductor 113, and conductors 60–1 through 60–4 to conductor 114, respectively. When, for example, signal lead 109–1 is connected to conductor 110 by switch 108, conductor 60–1 is connected to conductor 114 and conductor 112–1 is connected to conductor 113. It will be noted that conductor 113 is connected directly to a source of alternating current through on-off switch 116. When "on-off" switch 116 (FIG. 6) is closed, one of column indicator lamps 21–1 to 21–4 will be energized indicating the position of switch 30 and the column for which indicator lamps 158–1 through 158–4 are conditioned for energization. The same is true of signal conductors 109–1 through 109–4 inclusive.

However, the connection of conductor 114 to the source of power is completed through "read" switch 33 which is actuated by "read" button 31. Thus, when "read" switch 33 is closed, one of lamps 58–1 through 58–4 will be energized to project light onto the back of inserts 18 and thus render visible one of the character sequences in a selected column and at a selected row. While preamplifier 111 and amplifier 117 are continuously energized from the source of power, switch 34 prevents the passage of any signals from preamplifier 111 to amplifier 117 so that no sound is heard in headphones 39 or speaker 118. Moreover, the drive motor 87 is continuously energized so that at the amplifier terminal of switch 34, there is always a signal from one of the tracks of the record medium and closing of switch 34 immediately applies this signal to amplifier 117 for the production of an audible signal at headphones 39. Speaker 118 allows use of the machine in private rooms, homes, etc. and is controlled by switch 119.

It will be noted that switches 61 and 108 and the mechanical indexing mechanism form an electro-mechanical selection matrix which assures that the audio stimulus is associated with the visual stimulus. Moreover, once the carrier is positioned at a selected index position, and column selection knob 30 turned to one of the column numbers, switch 34 may be held closed to connect the selected scanning unit to amplifier 117 and headset 39 for as many repetitions of the auditory stimulus as the student desires. Likewise, switch 33 may be held closed for as long as the student desires to see the character sequence corresponding to the auditory stimulus. The time interval between presentation of the stimuli allows a student to make his response, whether mental, oral or written.

In use a prepared program is inserted in the machine. Preferably, knob 106 is moved to the top of slot 104, corresponding to index position one and column selection knob 30 is turned to column position one. The student then depresses "listen" button 32 to hear as many repetitions of any auditory stimulus as he desires, and may make a written response. When "read" button 31 is depressed, the student is provided with a pictorial or verbal stimulus as a reinforcement of his response and for as long as he desires. Alternatively, "read" button 31 may be depressed to present a visual stimulus to which the student may respond to an oral response, which may be reinforced by depressing "listen" button 32.

In teaching a language, I have found it particularly advantageous to first provide a program of stimuli of phonetical character (e.g., the International Phonetic Alphabet, Merriam-Webster Diacritics, etc.) and thus have the student learn phonetics to the extent that he can evaluate anyone's accuracy of pronunciation. Then I provide a program of stimuli corresponding to the desired foreign language and alternately presenting the stimuli to the student to effect retention of the foreign language.

From the foregoing description of my invention it can be seen that my teaching machine provides reinforcement of responses where either the stimulus or the response may be non-verbal (i.e., auditory or oral). Specifically, these stimulus-response forms are: auditory-verbal; auditory-oral; auditory and pictorial-verbal; pictorial-oral; pictorial and verbal-oral; auditory and verbal-oral; pictorial-oral and written; auditory-oral and written; pictorial and auditory-oral and written; verbal-oral and written; pictorial and verbal-oral and written; auditory and verbal-oral and written.

While I have shown and described one embodiment of my invention, it will be appreciated that numerous modifications and changes may be made thereto without departing from the scope of the invention. Accordingly, it is desired to comprehend all such modifications within this invention as may fall within the scope of the appended claims.

What I claim is:

1. A teaching machine comprising a first record medium comprising a rotatable magnetic cylinder, said magnetic cylinder having a plurality of tracks with different signals stored on the individual tracks, drive means for continuously driving said first record medium, a second record medium having stored thereon a plurality of normally non-visible character sequences, the number of said character sequences corresponding to the number of tracks on said first record medium and each character sequence being representative of the audio signal stored on a corresponding track of said first record medium, respectively, an indexable carrier, means defining a plurality of index positions for said carrier, each index position corresponding to a track on said first record medium, means for indexing said carrier to a selected index position, a scanning head mounted on said carrier for scanning one track on said first record medium, a sound reproducer, means for connecting said sound reproducer to said scanning head for producing an audio signal corresponding to the signal stored on said one track, means for operatively making one of said normally non-visible character sequences visible independently of said means for connecting said scanning head to said sound reproducer and means indexed synchronously with said carrier, and operatively associated with said means for operatively making one of said normally non-visible character sequences visible, for locating a related normally nonvisible character sequence to be made visible by said means for operatively making one of said normally non-visible character sequences visible.

2. A teaching machine as defined in claim 1 wherein said plurality of character sequences on said second record medium are arrayed in horizontal rows and vertical columns wherein the tracks on said first record medium are arranged in consecutive order, and wherein said last named means includes means for locating one character sequence in said array and a corresponding track on said first record medium.

3. A teaching machine as defined in claim 2 wherein the record tracks on said first record medium are divided into groups, the number of tracks of the groups corresponding to the number of columns of character sequences on said second record medium, and said indexing means includes means for locating said movable indexable carrier so that said scanning head is positioned over one of said groups of record tracks, and wherein said means for connecting said sound reproducer to said scanning head selects one of the tracks of said group of tracks corresponding to a selected character sequence.

4. A teaching machine comprising a first record medium having a plurality of consecutive groups of record tracks with different signals stored on the individual tracks thereof, drive means for said record medium, a second record medium having stored thereon a plurality of normally non-visible character sequences, the number of character sequences corresponding to the number of tracks on said record medium and each character sequence being representative of a corresponding audio signal stored on said first record medium, respectively, said character sequences being arrayed on said second record medium in horizontal rows and vertical columns with the number of vertical columns corresponding to the number of record tracks in a group of record tracks on said first record medium, an indexible carrier having a plurality of index positions, the number of such index positions corresponding to the number of rows of said normally non-visible character sequences on said second record medium, a multiple unit scanning head mounted on said carrier for scanning one group of said groups of record tracks, a sound reproducer, means for connecting said sound reproducer to one of the scanning units of said mutiple scanning head for producing an audio signal corresponding to the signal stored on one of the tracks of said group of tracks, means on said carrier for locating one of the character sequences of said plurality of character sequences, and means for operatively making said one normally non-visible character sequence visible independently of said means for connecting said scanning head to said sound reproducer.

5. A teaching machine as defined in claim 4 wherein said first record medium comprises a magnetic cylinder.

6. A teaching machine as defined in claim 4 including means for locating said carrier at a plurality of index positions, each index position corresponding to a row of normally non-visible character sequences.

7. A teaching machine as defined in claim 6 wherein said means for locating said carrier includes cooperating detent devices.

8. An audio-visual teaching machine comprising means for carrying a plurality of normally non-visible printed character sequences arrayed in horizontal rows and vertical columns, a record medium carrying a plurality of signals, each signal being related, respectively, to one of said normally non-visible printed character sequences, said signals being stored on said record medium in consecutive order and divisible into groups, the number of groups corresponding to the number of said horizontal rows and the number of record tracks in a group corresponding to the number of said vertical columns of said normally non-visible character sequences, a carrier movable to index positions corresponding to the rows of normally nonvisible printed character sequences, a plurality of aligned light sources corresponding in number to the number of vertical columns of normally non-visible printed character sequences, each light source being adapted, when energized, to make visible one character sequence in a corresponding column of character sequences, said light sources being moved to different index positions with said carrier, a transducer unit carried by said carrier for scanning one of said groups of record tracks and producing corresponding electrical signals for each track of said group of tracks, a sound reproducer, first switch means for conditioning said transducer for coupling one of said electrical signals to said reproducer and conditioning one of said light sources for energization, second switch means for energizing a selected light source, and third switch means for connecting a selected electrical signal to said sound reproducer.

9. An audio-visual teaching machine as defined in claim 8 wherein said record medium includes a magnetic cylinder having the longitudinal axis thereof parallel to the path of movement of said carrier, and wherein said vertical columns of normally non-visible printed character sequences are juxtaposed above said plurality of aligned light sources.

References Cited by the Examiner

UNITED STATES PATENTS

| | | | |
|---|---|---|---|
| 1,829,449 | 10/1931 | Kalbach | 281—7 X |
| 2,336,777 | 12/1943 | Clausen | 179—100.2 |
| 2,413,965 | 1/1947 | Goldsmith | 35—8 X |
| 2,498,578 | 2/1950 | Reinnagel | 35—35.3 |
| 2,650,097 | 8/1953 | Erdos | 35—35 X |
| 2,820,639 | 1/1958 | Gillette et al. | 274—17 X |
| 2,974,960 | 3/1961 | Hyatt | 179—100.2 X |
| 2,976,372 | 3/1961 | Sampson | 35—35.3 X |
| 3,020,360 | 2/1962 | Gratian et al. | 179—100.2 X |
| 3,029,080 | 4/1962 | Lang | 179—100.2 X |
| 3,029,683 | 4/1962 | Zaromb | 35—35 X |
| 3,075,775 | 1/1963 | Druz | 179—100.2 X |

JEROME SCHNALL, *Primary Examiner.*

ABRAHAM BERLIN, LAWRENCE CHARLES,
*Examiners.*